(12) United States Patent
Kumamoto et al.

(10) Patent No.: US 10,189,135 B2
(45) Date of Patent: Jan. 29, 2019

(54) MOTOR DRIVE DEVICE CAPABLE OF NOTIFYING ADHESION OF CUTTING FLUID

(71) Applicant: FANUC CORPORATION, Minamitsuru-gun, Yamanashi (JP)

(72) Inventors: Yuuki Kumamoto, Minamitsuru-gun (JP); Yasuyuki Matsumoto, Minamitsuru-gun (JP); Kiichi Inaba, Minamitsuru-gun (JP); Naoki Masuda, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 236 days.

(21) Appl. No.: 15/217,075

(22) Filed: Jul. 22, 2016

(65) Prior Publication Data
US 2017/0030747 A1    Feb. 2, 2017

(30) Foreign Application Priority Data
Jul. 29, 2015 (JP) .................. 2015-149841

(51) Int. Cl.
*B23Q 17/00* (2006.01)
*B23Q 11/10* (2006.01)

(52) U.S. Cl.
CPC .............. *B23Q 17/00* (2013.01); *B23Q 11/10* (2013.01)

(58) Field of Classification Search
CPC ......... B23Q 11/08; B23Q 11/10; B23Q 11/12; B23Q 17/00; B23Q 2717/00; B23Q 2717/003; B23Q 2717/006; H02K 5/00; H02K 5/02

USPC ........................................................ 116/206
See application file for complete search history.

(56) References Cited

U.S. PATENT DOCUMENTS

| | | | |
|---|---|---|---|
| 3,260,234 A * | 7/1966 | Serrano et al. ........ | B01D 53/26 116/206 |
| 4,205,043 A * | 5/1980 | Esch et al. ........... | G01N 31/224 116/206 |
| 5,967,716 A | 10/1999 | Katsuzawa et al. | |
| 6,287,058 B1 * | 9/2001 | Arai et al. ......... | B23Q 11/0046 408/56 |
| 7,185,601 B2 * | 3/2007 | Carpenter et al. ... | G01N 21/293 116/206 |
| 7,923,670 B2 * | 4/2011 | Hirano et al. ..... | H05K 7/20172 219/757 |
| 8,003,234 B2 | 8/2011 | Omori et al. | |
| 9,080,987 B2 | 7/2015 | Faenza | |
| 9,526,173 B2 * | 12/2016 | Chou et al. ............ | H05K 1/181 |
| 2013/0116460 A1 * | 5/2013 | Kanetani et al. .... | C10M 107/34 554/213 |

(Continued)

FOREIGN PATENT DOCUMENTS

JP    07140078 A    6/1995
JP    11179631 A    7/1999

(Continued)

*Primary Examiner* — R. A. Smith
(74) *Attorney, Agent, or Firm* — RatnerPrestia

(57) ABSTRACT

A motor drive device is capable of allowing a user to surely recognize that effect when a cutting fluid adheres to a casing. The motor drive device includes an electronic component and a casing that houses the electronic component. A part of the casing changes color when coming in contact with a cutting fluid and the casing may change to different colors based on the concentration of the cutting fluid.

11 Claims, 8 Drawing Sheets

(56) References Cited

U.S. PATENT DOCUMENTS

2014/0085820 A1* 3/2014 Yamamoto et al. ........................ H05K 7/20909
361/695
2015/0048250 A1* 2/2015 Cadieux, Jr. et al. .. B07C 5/342
250/339.05
2017/0087681 A1* 3/2017 Matsuda et al. ... B23Q 11/0067

FOREIGN PATENT DOCUMENTS

| | | | |
|---|---|---|---|
| JP | 2003001544 | A | 1/2003 |
| JP | 2005161471 | A | 6/2005 |
| JP | 2008090010 | A | 4/2008 |
| JP | 2009115737 | A | 5/2009 |
| JP | 2011189505 | A | 9/2011 |
| JP | 2012116922 | A | 6/2012 |
| JP | 2014515487 | A | 6/2014 |
| JP | 2014146393 | A | 8/2014 |
| JP | 2015089229 | A | 5/2015 |
| JP | 2015098142 | A | 5/2015 |
| JP | 2015-103750 | A | 6/2015 |
| JP | 2015159159 | A | 9/2015 |
| PL | 160207 | B1 * | 2/1993 .......... C10M 133/16 |

* cited by examiner

MOTOR DRIVE DEVICE CAPABLE OF NOTIFYING ADHESION OF CUTTING FLUID

BACKGROUND OF THE INVENTION

1. Field of the Invention

The invention relates to a motor drive device capable of notifying a user of adhesion of a cutting fluid.

2. Description of the Related Art

A technique is known that, in a motor drive device for driving a servo motor incorporated in a machine tool or the like, prevents a cutting fluid or the like from adhering to an electronic component incorporated in the motor drive device (e.g., Japanese Laid-open Patent Publication No. 2015-103750).

In the field of the technique, there is a desire for a technique capable of allowing a user to recognize when a cutting fluid has adhered to a casing of a motor drive device.

SUMMARY OF THE INVENTION

In an aspect of the invention, a motor drive device includes an electronic component and a casing which houses the electronic component. At least a part of the casing discolors when it comes in contact with a cutting fluid. At least a part of the casing may discolor into different colors in response to the concentration of the contacting cutting fluid.

The casing may be made of a material which discolors when it comes in contact with the cutting fluid. The casing may include a main body and a discoloring part provided on an outer surface of the main body and discoloring when it comes in contact with the cutting fluid.

The discoloring part may be detachably attached to the outer surface of the main body. The discoloring part may be a thin membrane layer laminated on the outer surface of the main body. The main body may include a flow path for the cutting fluid adhering to the outer surface of the main body. The discoloring part may be arranged on the flow path.

The flow path may be formed by a groove recessed from the outer surface of the main body. The cutting fluid may include chlorine or bromine. The casing may contain an acid-base indicator which discolors when it contacts the cutting fluid.

BRIEF DESCRIPTION OF THE DRAWINGS

The above-described and other objects, features, and advantages of the invention will be clarified from the following description of preferable embodiments with reference to the accompanying drawings, in which.

DETAILED DESCRIPTION

Figure 1:
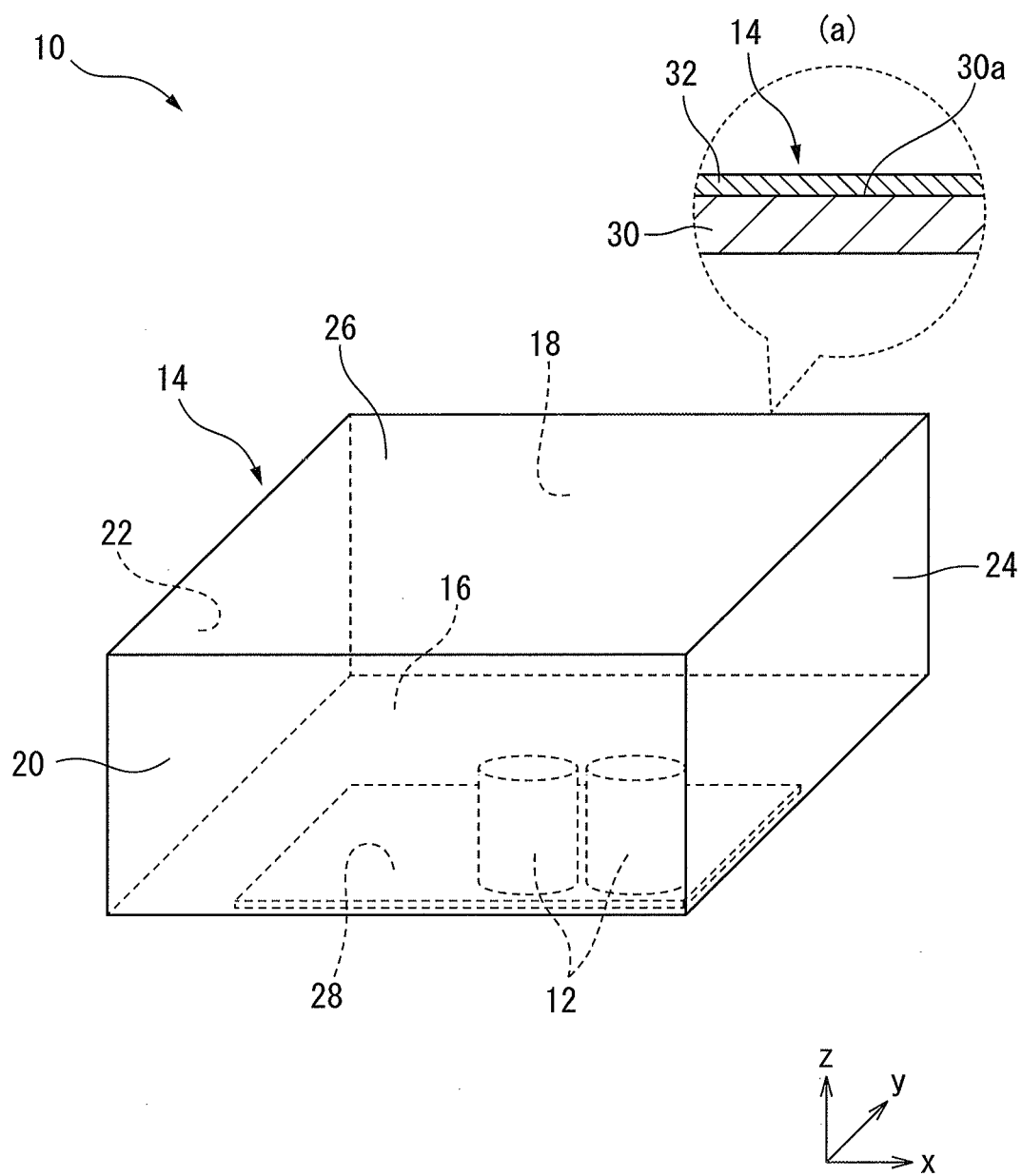
FIG. 1 is a perspective view of a motor drive device according to an embodiment of the invention, wherein region (a) in the drawing shows a cross-sectional view of a casing.

Hereinafter, embodiments of the invention will be described in detail based on the drawings. First, a motor drive device 10 according to an embodiment of the invention will be described with reference to FIG. 1. Note that, in the following description, the orthogonal coordinate system in the drawing is used as a reference of direction, and an x-axis plus direction, a y-axis plus direction, and a z-axis plus direction are respectively referred as the right direction (rightward), the front direction (frontward), and the upper direction (upward), for convenience.

The motor drive device 10 is a device for supplying electric power to a servo motor incorporated in e.g. a machine tool so as to drive the servo motor. The motor drive device 10 is normally housed in a control panel arranged adjacent to a workcell of the machine tool.

The motor drive device 10 includes electronic components 12 and a casing 14 which houses the electronic components 12. The electronic components 12 include e.g. a power element, and generate electric power to be supplied to the servo motor of e.g. the machine tool.

The casing 14 is a rectangular-parallelepiped-shaped hollow member, and includes a bottom wall 16, a front wall 18, a rear wall 20, a left wall 22, a right wall 24, and a top wall 26. The front wall 18 is provided so as to extend upward from a front edge of the bottom wall 16.

The rear wall 20 is provided so as to extend upward from a rear edge of the bottom wall 16 to be opposite to the front wall 18. The left wall 22 is provided so as to extend upward from a left edge of the bottom wall 16 and extend between the front wall 18 and the rear wall 20.

The right wall 24 is provided so as to extend upward from a right edge of the bottom wall 16 to be opposite to the left wall 22, and extend between the front wall 18 and the rear wall 20. The top wall 26 is arranged opposite to the bottom wall 16, and connected to top edges of the front wall 18, the rear wall 20, the left wall 22, and the right wall 24.

In this embodiment, the electronic components 12 are mounted on a substrate 28 fixed on the bottom wall 16 of the casing 14.

The casing 14 (i.e., each of the bottom wall 16, the front wall 18, the rear wall 20, the left wall 22, the right wall 24, and the top wall 26) has a double-layer structure. Specifically, as shown in region (a) in FIG. 1, the casing 14 includes a main body 30 and a discoloring part 32. The discoloring part 32 is a thin membrane layer laminated on an outer surface 30a of the main body 30, and forms the outer surface of the casing 14.

The main body 30 is made of e.g. a resin material. On the other hand, the discoloring part 32 contains a discoloring substance which reacts with a component included in a cutting fluid used in the machine tool so as to discolor when it comes in contact with the cutting fluid.

The discoloring substance includes e.g. an indicator such as an acid-base indicator, an oxidation-reduction indicator, or an adsorption indicator. In this case, the discoloring part 32 discolors into different colors in response to a concentration of the component (e.g., chlorine or bromine) contained in the cutting fluid. Note that, the phrase "discolors into different colors" includes changing the shade (or tone) of a specific color, and changing to a color of different wavelength (e.g., red, blue, or yellow).

As an example, the discoloring part 32 may be formed by applying a coating material which contains a discoloring substance (an indicator etc.) on an outer surface of the main body 30. As another example, the discoloring part 32 may be formed by laminating a material which contains a discoloring substance (an indicator etc.) on the outer surface of the main body 30 by a method of e.g. CVD (Chemical Vapor Deposition).

As still another example, the discoloring part 32 may be comprised of a thin membrane (e.g., a flexible film or paper) which contains a discoloring substance (an indicator etc.) and which is attached to the outer surface of the main body 30 via an adhesive or the like.

Next, a function of the casing 14 according to this embodiment will be described with reference to FIGS. 1 and 2. As described above, the motor drive device 10 is housed in the control panel adjacent to the machine tool.

In such a machine tool, a cutting fluid generated during operation of the machine tool may enter into the control panel and adhere to the casing 14 of the motor drive device 10. The cutting fluid used in the machine tool includes e.g. chlorine or bromine, and may causes corrosion or breakdown of the electronic component 12 when contacting the electronic component 12.

In order to prevent such corrosion or breakdown of the electronic component 12 due to the cutting fluid, when the cutting fluid adheres to the casing 14, the casing 14 according to this embodiment reliably notifies a user of the adherence of the cutting fluid onto the casing 14.

Specifically, the outer surface of the casing 14 is formed by the discoloring part 32 which discolors by contacting the cutting fluid, as described above. Accordingly, when the cutting fluid enters into the control panel and adheres to the casing 14, a part of the discoloring part 32, to which the cutting fluid has adhered, discolors.

Figure 2:
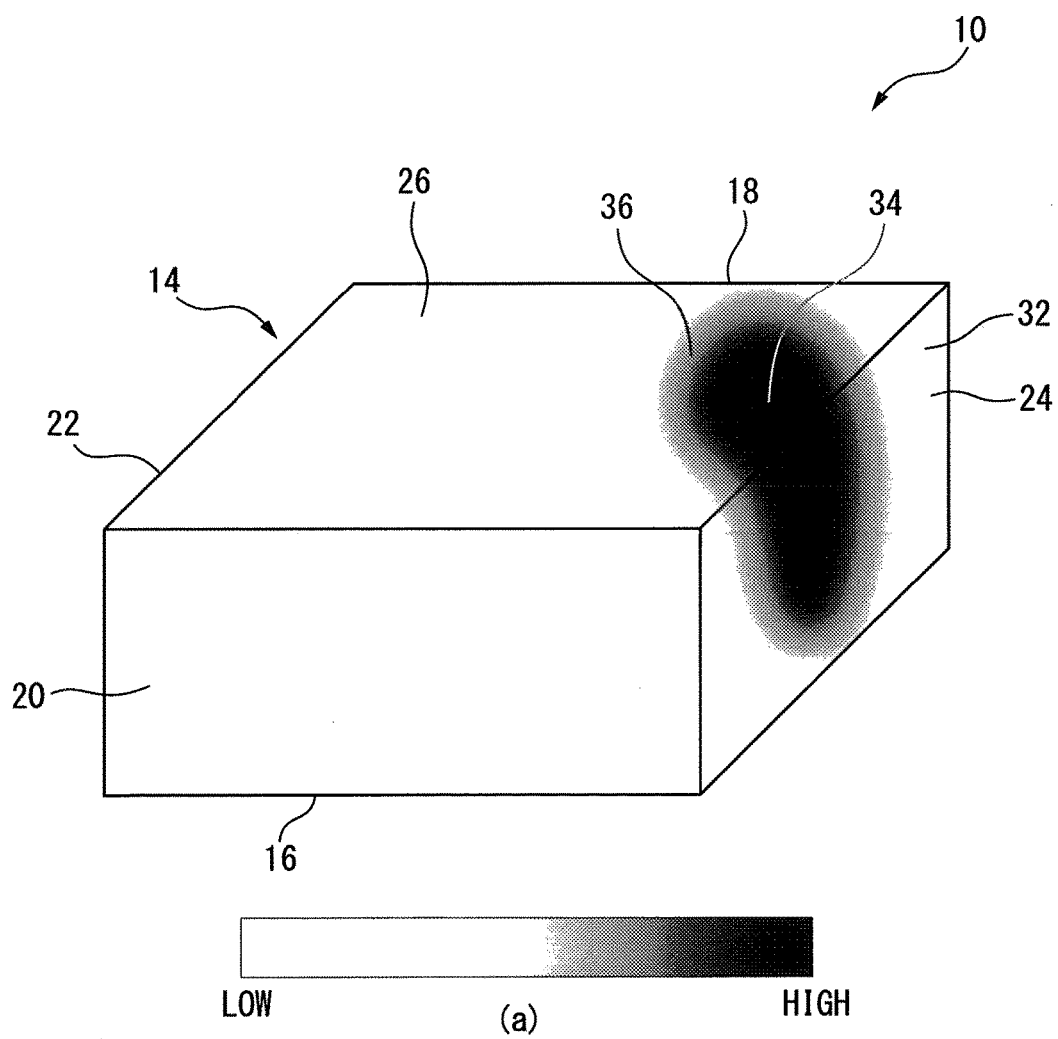
FIG. 2 is a diagram for illustrating a function of the casing shown in FIG. 1, wherein region (a) in the drawing shows a relationship between concentration of a cutting fluid and degree of color change.

FIG. 2 shows an example of discoloring of the discoloring part 32. As shown in region (a) of FIG. 2, in this embodiment, the discoloring part 32 is configured so as to discolor into a lighter color when the concentration of the component (e.g., chlorine or bromine) included in the contacting cutting fluid is lower, and to discolor into a darker color when the concentration of the component (e.g., chlorine or bromine) included in the contacting cutting fluid is higher.

In the example shown in FIG. 2, the discoloring part 32 discolors into a dark color in a region 34 on the outer surface of the casing 14, and discolors into a light color in a region 36 around the region 34. In this case, the user can infer that the cutting fluid entering into the control panel has mainly adhered to the region 34, and then has spread to the region 36 around the region 34.

Thus, according to this embodiment, it is possible to notify the user that the cutting fluid has entered into the control panel and adhered to the outer surface of the casing 14, by discoloring. Accordingly, the user can visually recognize the entrance of the cutting fluid into the control panel and the adhesion thereof to the casing 14, and can take preventive measures for previously preventing the electronic component 12 from being broken down by the cutting fluid.

In addition, the user can also infer a path of the cutting fluid entering into the control panel from a color distribution of the discoloring part 32. For example, in the example shown in FIG. 2, the cutting fluid appears to enter into the control panel near the dark color region 34. Thus, the user easily specifies the position in the control panel at which the cutting fluid has entered.

Further, in this embodiment, since the entrance of the cutting fluid can be detected early as described above, it is not necessary to configure the motor drive device 10 in a sealed structure and to remove a cooling fan from the motor drive device 10, in order to prevent the entrance of the cutting fluid. Thereby, it is possible to improve the degree of freedom in thermal design of the motor drive device 10.

Note that, the casing 14 in this embodiment is constituted by the double-layer structure of the main body 30 and the discoloring part 32. However, the casing itself may be made of a material which discolors when it contacts the cutting fluid.

For example, a discoloring substance (an indicator etc.), which discolors by contacting the cutting fluid, may be mixed with a base material (e.g., resin), and the casing may be produced by the mixture of the base material and the discoloring substance. The casing thus produced also discolors as shown in FIG. 2 when the cutting fluid adheres to the outer surface of this casing, similar as the above-mentioned casing 14. Accordingly, the user can visually recognize the entrance of the cutting fluid into the control panel and the adhesion thereof to the casing.

Note that, in the above embodiment, the whole of the casing 14 (i.e., each of the bottom wall 16, the front wall 18, the rear wall 20, the left wall 22, the right wall 24, and the top wall 26) has the double-layer structure of the main body 30 and the discoloring part 32.

However, only a part of the casing 14 (e.g., the front wall 18, the right wall 24, and the top wall 26) may have the double-layer structure of the main body 30 and the discoloring part 32, while the other part of the casing 14 (e.g., the bottom wall 16, the rear wall 20, and the left wall 22) may have a single-layer structure of the main body 30.

Figure 3:
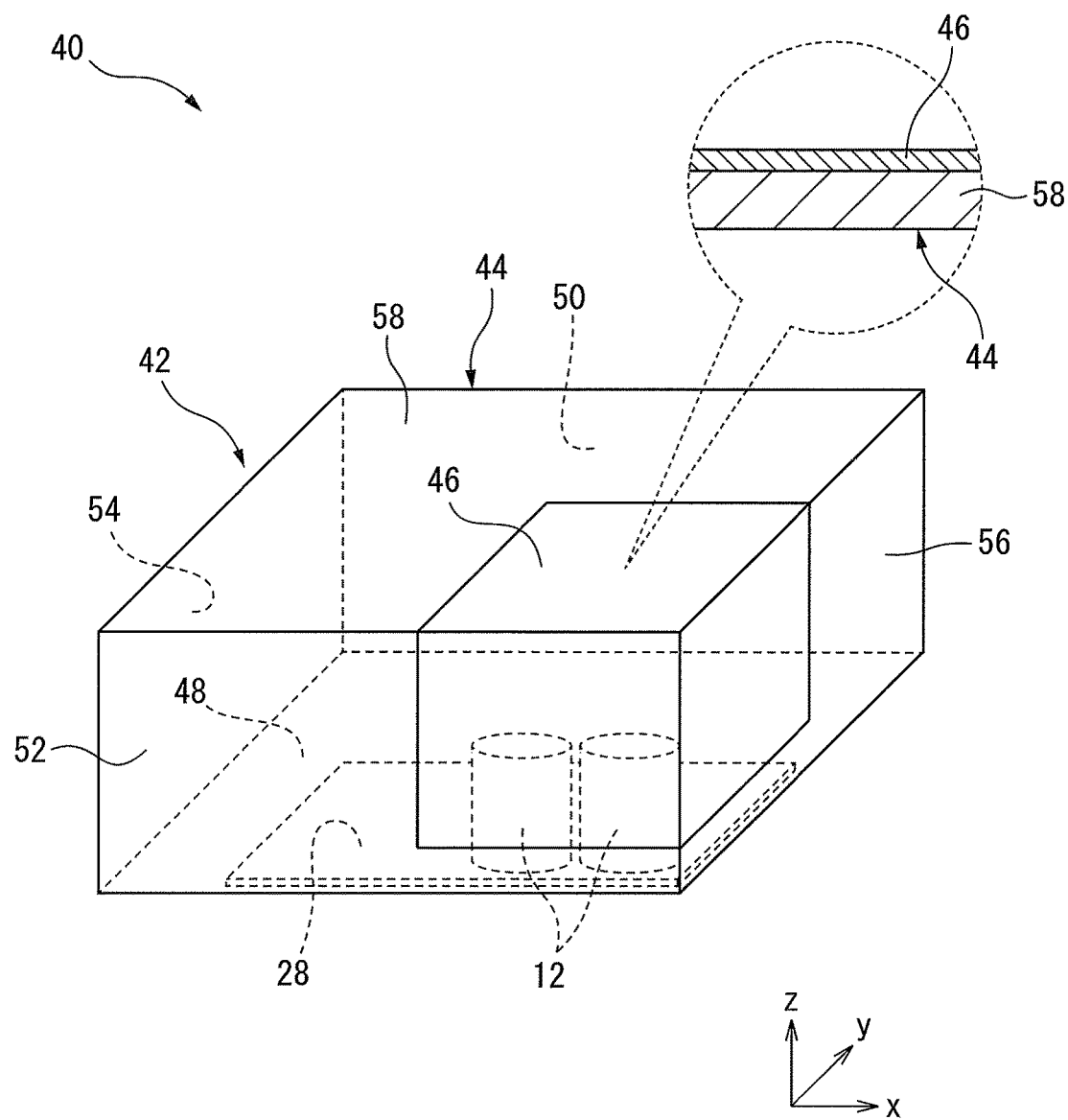
FIG. 3 is a perspective view of a motor drive device according to another embodiment of the invention.

Next, a motor drive device 40 according to another embodiment will be described with reference to FIG. 3. Note that, in various embodiments described hereinafter, elements similar to that of the already-mentioned embodiments are assigned the same reference numerals, and detailed descriptions thereof will be omitted.

The motor drive device 40 includes the electronic component 12 and a casing 42 which houses the electronic component 12. The casing 42 includes a main body 44 and a discoloring part 46 detachably attached to an outer surface of the main body 44.

The main body 44 is e.g. a rectangular-parallelepiped-shaped hollow member made of resin or the like, and includes a bottom wall 48, a front wall 50, a rear wall 52, a left wall 54, a right wall 56, and a top wall 58. The electronic component 12 is mounted on the substrate 28 fixed on the bottom wall 48 of the main body 44.

The front wall 50 is provided so as to extend upward from a front edge of the bottom wall 48. The rear wall 52 is provided so as to extend upward from a rear edge of the bottom wall 48 to be opposite to the front wall 50. The left wall 54 is provided so as to extend upward from a left edge of the bottom wall 48 and extend between the front wall 50 and the rear wall 52.

The right wall 56 is provided so as to extend upward from a right edge of the bottom wall 48 to be opposite to the left wall 54, and extend between the front wall 50 and the rear wall 52. The top wall 58 is arranged opposite to the bottom wall 48 so as be connected to top edges of the front wall 50, the rear wall 52, the left wall 54, and the right wall 56.

The discoloring part 46 is a thin membrane separated from the main body 44, and is detachably attached to the main body 44 via a releasable adhesive tape or the like, for example. The discoloring part 46 contains a discoloring substance which reacts with a component included in the cutting fluid so as to discolor when it comes in contact with the cutting fluid, similar as the above-described discoloring part 32.

The discoloring part 46 is arranged so as to cover a region of the outer surface of the main body 44 near the electronic component 12. Specifically, in the example shown in FIG. 3, the electronic component 12 is arranged at the right and rear region of the bottom wall 48 of the main body 44. The discoloring part 46 covers the right region of the outer surface of the rear wall 52, the rear region of the outer surface of the right wall 56, and the right and rear region of the outer surface of the top wall 58.

Figure 4:
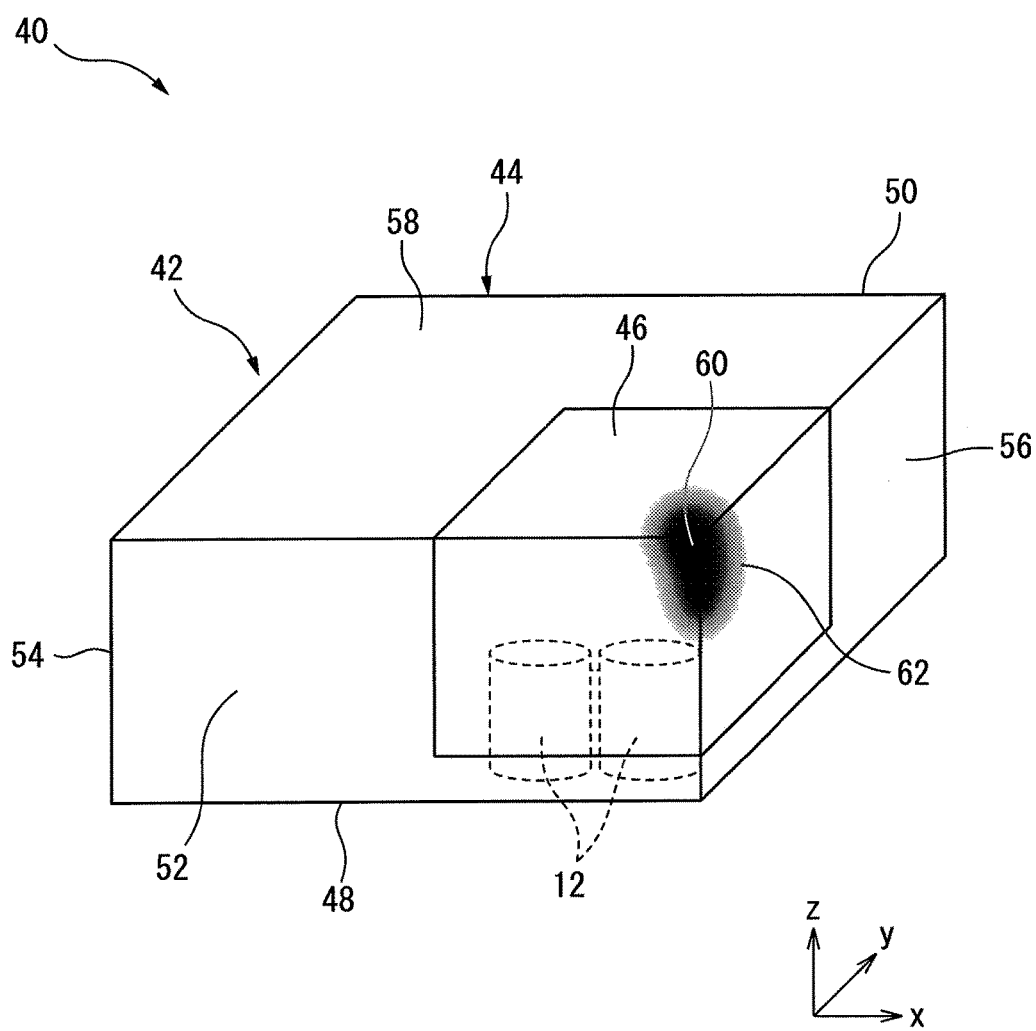
FIG. 4 is a diagram for illustrating a function of the casing shown in FIG. 3.

Next, a function of the casing 42 according to this embodiment will be described with reference to FIGS. 3 and 4. In the example shown in FIG. 4, the discoloring part 46 discolors into a dark color in a region 60, and into a light color in a region 62 around the region 60. In this case, the user can infer that the cutting fluid entering into the control panel has mainly adhered to the region 60, and then spread to the region 62 therearound.

In this embodiment, the discoloring part 46 is arranged so as to cover a region of the outer surface of the main body 44 near the electronic component 12. According to this configuration, the user can easily detect whether or not the cutting fluid infiltrating inside the control panel has adhered to the region around the electronic component 12 on the casing 42.

Accordingly, the user can effectively recognize the risk of breakdown of the electronic component 12 due to the cutting fluid, and can take preventive measures for preventing the breakdown in advance, in response to the risk.

On the other hand, in this embodiment, the discoloring part 46 is not provided on a region of the main body 44 where the risk of breakdown of the electronic component 12 is low even when the cutting fluid adheres thereto (i.e., a region spaced apart from the electronic component 12 by a predetermined distance). Thus, a material cost necessary for the discoloring part 46 can be reduced.

Figure 6:
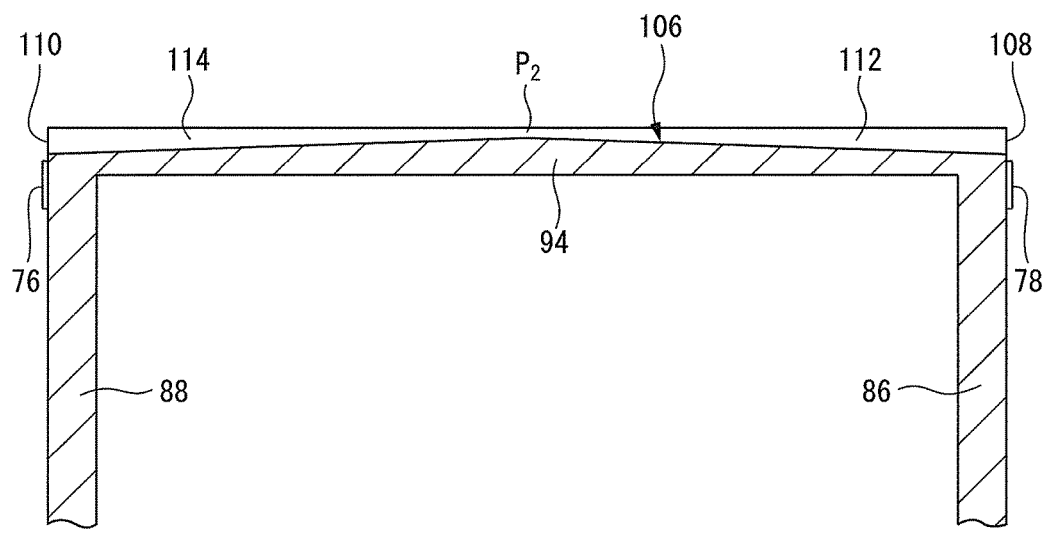
FIG. 6 is a cross-sectional view of the casing shown in FIG. 5 cut along a y-z plane in FIG. 5.
Figure 6:
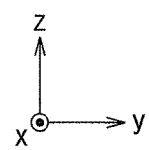
Figure 7:
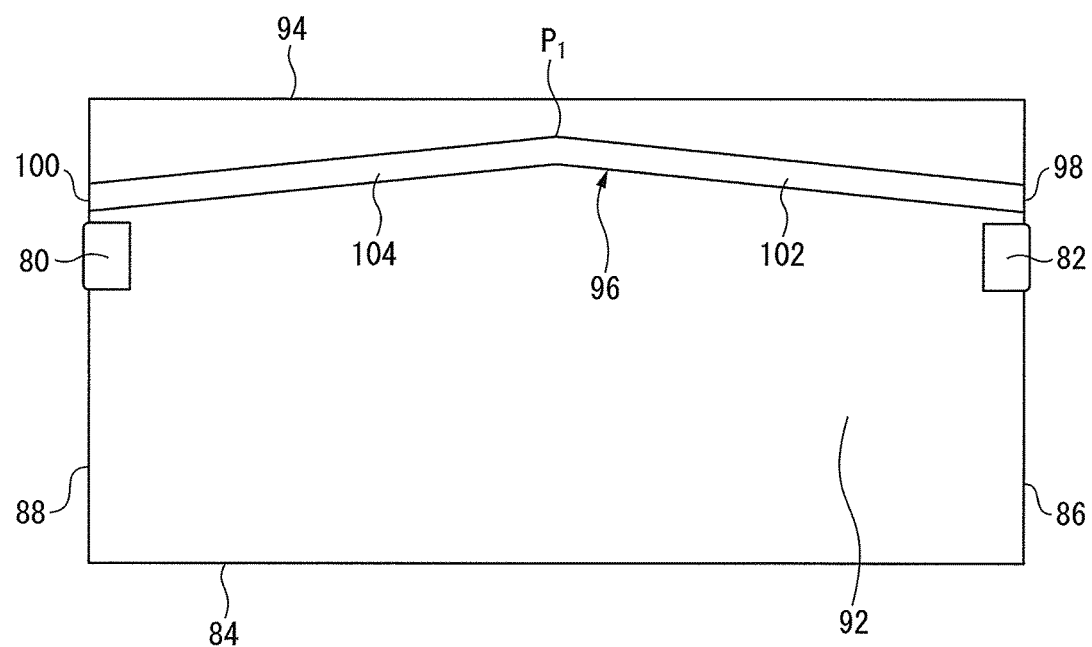
FIG. 7 is a side view of the casing shown in FIG. 5 as seen from a right side thereof (i.e., an x-axis plus direction side)

Next, a motor drive device 70 according to further still another embodiment will be described with reference to FIGS. 5 to 7. The motor drive device 70 includes the electronic component 12 and a casing 72 which houses the electronic component 12. The casing 72 includes a main body 74 and discoloring parts 76, 78, 80, and 82 provided on an outer surface of the main body 74.

The main body 74 is e.g. a rectangular-parallelepiped-shaped hollow member made of e.g. resin, and includes a bottom wall 84, a front wall 86, a rear wall 88, a left wall 90, a right wall 92, and a top wall 94. The electronic component 12 is mounted on the substrate 28 fixed on the bottom wall 84 of the main body 74.

The front wall 86 is provided so as to extend upward from a front edge of the bottom wall 84. The rear wall 88 is provided so as to extend upward from a rear edge of the bottom wall 84 to be opposite to the front wall 86. The left wall 90 is provided so as to extend upward from a left edge of the bottom wall 84 and extend between the front wall 86 and the rear wall 88.

The right wall 92 is provided so as to extend upward from a right edge of the bottom wall 84 to be opposite to the left wall 90, and extend between the front wall 86 and the rear wall 88. As shown in FIGS. 5 and 7, the right wall 92 is formed with a groove 96.

The groove 96 is formed so as to be recessed inward from an outer surface of the right wall 92 and extend between a first open end 98 formed at the front wall 86 and a second open end 100 formed at the rear wall 88. More specifically, as show in FIG. 7, the groove 96 includes a first groove part 102 extending from a position $P_1$ to the first open end 98 and a second groove part 104 extending from the position $P_1$ to the second open end 100. The position $P_1$ is located at the center in the front-rear direction of the right wall 92.

The first groove part 102 is inclined with respect to a horizontal plane (i.e., an x-y plane) so as to extend downward as it extends frontward from the position $P_1$. On the other hand, the second groove part 104 is inclined with respect to the horizontal plane so as to extend downward as it extends rearward from the position $P_1$.

The second groove part 104 is arranged so as to extend near the electronic component 12. The first groove part 102 and the second groove part 104 communicate with each other.

The top wall 94 is arranged opposite to the bottom wall 84 and connected to top edges of the front wall 86, the rear wall 88, the left wall 90, and the right wall 92. As shown in FIGS. 5 and 6, the top wall 94 is formed with a groove 106.

The groove 106 is formed so as to be recessed inward from an outer surface of the top wall 94 and extend between a first open end 108 formed at the front wall 86 and a second open end 110 formed at the rear wall 88. More specifically, as shown in FIG. 6, the groove 106 includes a first groove part 112 extending from a position $P_2$ to the first open end 108 and a second groove part 114 extending from the position $P_2$ to the second open end 110.

The position $P_2$ is located at the center in the front-rear direction of the top wall 94. The first groove part 112 is formed so that its depth in a vertical direction gets deeper as the groove part 112 extends forward from the position $P_2$. On the other hand, the second groove part 114 is formed so that its depth in a vertical direction gets deeper as the second groove part 114 extends rearward from the position $P_2$.

The second groove part 114 is arranged so as to extend near (just above) the electronic component 12. The first groove part 112 and the second groove part 114 communicate with each other.

Each of the discoloring parts 76, 78, 80, and 82 is a substantially quadrangular-shaped thin membrane, and is detachably attached to the outer surface of the main body 74 via e.g. a releasable adhesive tape, etc. Similar as the above-described discoloring parts 32 and 46, each of the discoloring parts 76, 78, 80, and 82 contains a discoloring substance which reacts with a component included in the cutting fluid so as to discolor when it comes in contact with the cutting fluid.

The discoloring part 76 is arranged on an outer surface of the rear wall 88 at a position just below the second open end 110 of the groove 106. On the other hand, the discoloring part 78 is arranged on an outer surface of the front wall 86 at a position just below the first open end 108 of the groove 106.

The discoloring part 80 is arranged over outer surfaces of the rear wall 88 and the right wall 92 at a position just below the second open end 100 of the groove 96. On the other hand, the discoloring part 82 is arranged over outer surfaces of the right wall 92 and the front wall 86 at a position just below the first open end 98 of the groove 96.

Next, a function of the casing 72 according to this embodiment will be described with reference to FIGS. 5 to 7. The groove 106 formed at the top wall 94 of the casing 72 forms a flow path for a cutting fluid adhering to the outer surface of the top wall 94.

More specifically, if the cutting fluid adheres to the outer surface of the top wall 94 and accumulates there, at least a part of the adhering cutting fluid enters the groove 106 and pools there. As described above, the groove 106 is formed so that its depth gets gradually deeper toward the first open end 108 or the second opening end 110.

Accordingly, the cutting fluid pooled in the groove 106 flows through the groove 106 toward the first open end 108 or the second open end 110 by the action of gravity. Then, the cutting fluid reaching the first open end 108 flows downward on the outer surface of the front wall 86 by the action of gravity, and consequently reaches the discoloring part 78 arranged just below the first open end 108.

On the other hand, the cutting fluid reaching the second open end 110 flows downward on the outer surface of the rear wall 88 by the action of gravity, and reaches the discoloring part 76 arranged just below the second open end 110.

Similarly, the groove 96 formed at the right wall 92 of the casing 72 forms a flow path for the cutting fluid adhering to the outer surface of the right wall 92. Specifically, the groove 96 extends so as to be inclined with respect to the horizontal plane, as described above.

Accordingly, the cutting fluid pooled in the groove 96 flows toward the first open end 98 or the second open end 100 by the action of gravity. Then, the cutting fluid reaching the first open end 98 flows downward on the outer surface of the front wall 86 or the right wall 92 by the action of gravity, and consequently reaches the discoloring part 82 arranged just below the first open end 98.

On the other hand, the cutting fluid reaching the second open end 100 flows downward on the outer surface of the rear wall 88 or the right wall 92 by the action of gravity, and reaches the discoloring part 80 arranged just below the second open end 100.

Thus, in this embodiment, the grooves 96 and 106 form the flow paths for the cutting fluid as described above, and the discoloring parts 76, 78, 80, and 82 are arranged on the flow paths of the cutting fluid. Therefore, the cutting fluid adhering to the outer surface of the casing 72 can be effectively guided to the discoloring parts 76, 78, 80, and 82.

According to this configuration, it is possible to more efficiently detect the adhesion of the cutting fluid onto the casing 72 by the discoloring parts 76, 78, 80 and 82. Further, the discoloring parts 76, 78, 80, and 82 can be downsized, thereby it is possible to reduce material cost necessary for these discoloring parts.

In the above-mentioned embodiment, the right wall 92 and the top wall 94 are respectively formed with one groove 96 and one groove 106. However, a groove(s) may be formed at any part(s) of the main body 74 other than the right wall 92 and the top wall 94, such as the front wall 86, the rear wall 88, and the left wall 90.

Further, each of the rear wall 88, the left wall 90, the right wall 92 and the top wall 94 may be formed with a single groove or a plurality of grooves.

In this case, the groove(s) may be arranged so as to extend near the electronic component 12, by which the detection sensitivity for the adhesion of a cutting fluid can be enhanced near the electronic component 12.

Figure 8:
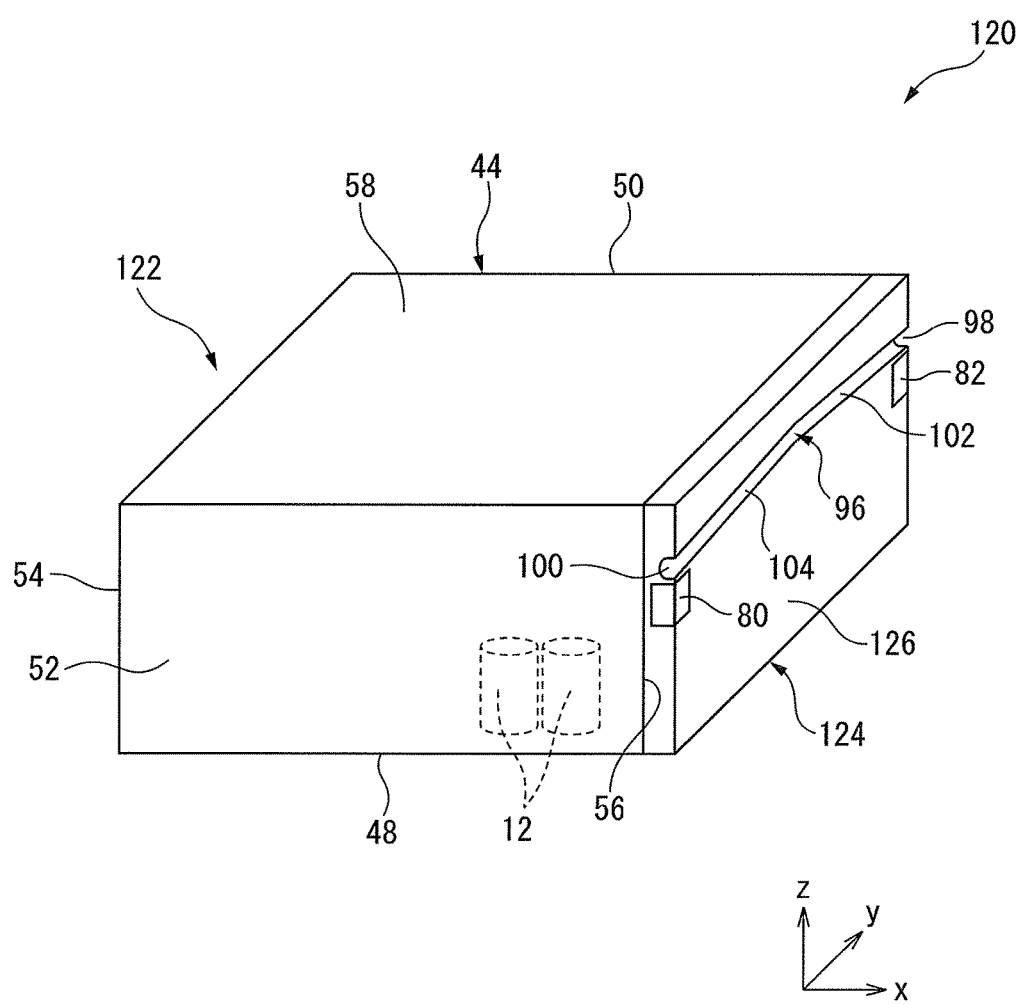
FIG. 8 is a perspective view of a motor drive device according to still another embodiment of the invention.

Next, a motor drive device 120 according to still another embodiment will be described with reference to FIG. 8. The motor drive device 120 includes the electronic component 12 and a casing 122 which houses the electronic component 12.

The casing 122 includes the main body 44, an auxiliary member 124 detachably attached to the outer surface of the right wall 56 of the main body 44, and the discoloring parts 80 and 82 provided on outer surfaces of the auxiliary member 124.

In this embodiment, the auxiliary member 124 is a plate member, and is detachably attached to the outer surface of the right wall 56 of the main body 44 via e.g. an adhesive or a fastening tool such as a bolt. The above-described groove 96 is formed at the auxiliary member 124 so as to be recessed inward from a right end face 126 of the auxiliary member 124.

The discoloring part 82 is arranged on the outer surface of the auxiliary member 124 at a position just below the first open end 98 of the groove 96. On the other hand, the discoloring part 80 is arranged on the outer surface of the auxiliary member 124 at a position just below the second open end 100 of the groove 96.

Thus, in this embodiment, the auxiliary member 124 with the groove 96 and the discoloring parts 80 and 82 is produced as a member separated from the main body 44, and is detachably attached to the main body 44.

According to this configuration, the user can select whether or not to provide the function of detecting the adhesion of a cutting fluid to the casing 122, dependent on the application of the motor drive device 120. Accordingly, it is possible to apply the motor drive device to various applications.

Figure 5:
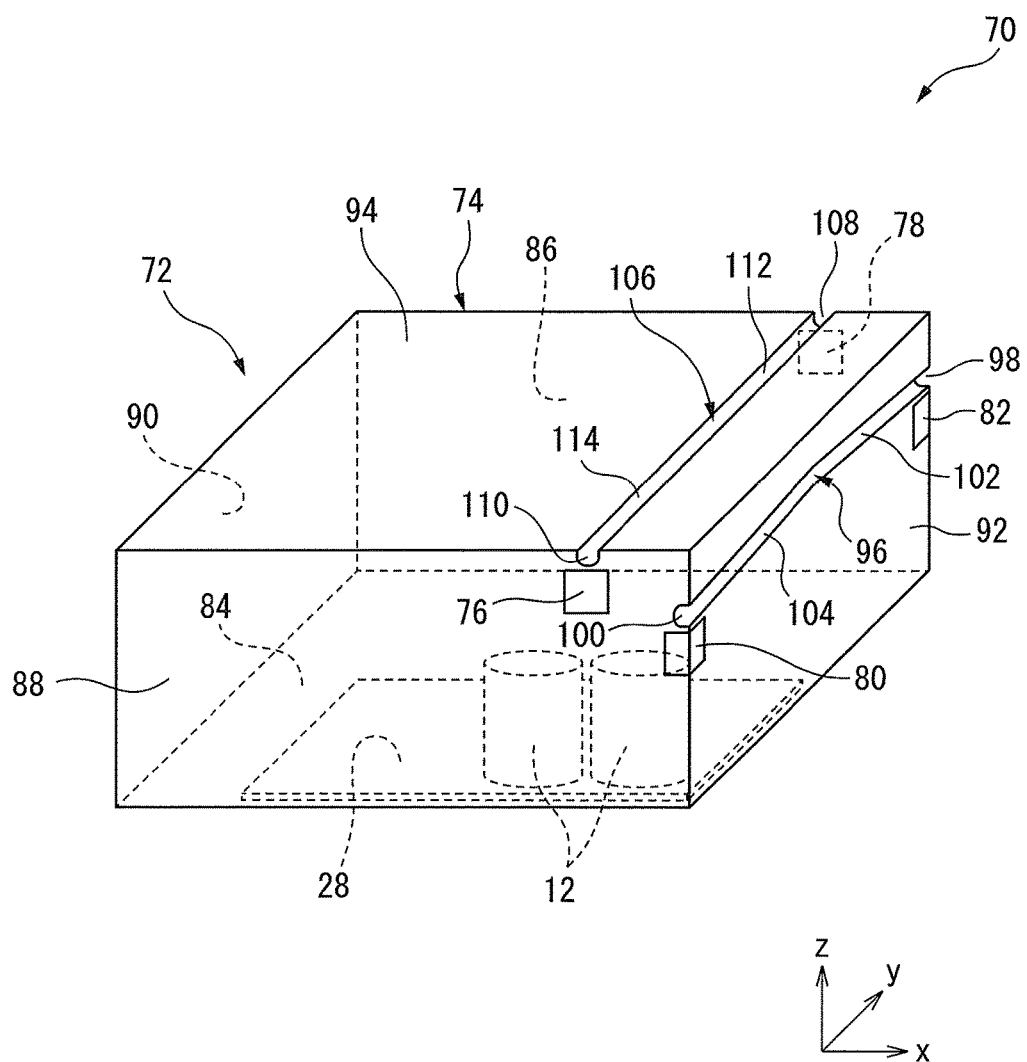
FIG. 5 is a perspective view of a motor drive device according to still another embodiment of the invention.

Note that, the casing 122 according to this embodiment may further include a second auxiliary member having the groove 106 and the discoloring parts 76 and 78 shown in FIG. 5, in addition to the auxiliary member 124. In this case, the second auxiliary member can be detachably attached on the outer surface of the top wall 58 of the main body 44.

Further, in the above embodiment, the auxiliary member 124 includes the groove 96 and the discoloring parts 80 and 82. However, the auxiliary member may include the groove 96 or the discoloring part 80 or 82.

Further, the casing is not limited to the rectangular-parallelepiped-shaped one, and may have e.g. cylindrical or any other shape.

Further, in the above-described embodiments, the discoloring parts 32, 46, 76, 78, 80, and 82 discolor into different colors in response to the concentration of a component included in a cutting fluid. However, each of the discoloring parts 32, 46, 76, 78, 80, and 82 may discolor into a predetermined color when it contacts a cutting fluid, regardless of the concentration of the cutting fluid.

Further, in the above-described embodiments, the shade (or tone) of color of each discoloring part 32, 46, 76, 78, 80, and 82 changes in response to the concentration of a cutting fluid. However, the discoloring parts 32, 46, 76, 78, 80, and 82 may discolor into colors of different wavelengths (red, blue, and yellow) in response to the concentration of a cutting fluid.

Further, the cutting fluid may include e.g. a hydrocarbon-based solvent, an ester-based solvent, an ether-based solvent, a fluorine-containing solvent, a phosphorus-containing solvent, a silicon-containing solvent, or the like, other than the above-mentioned chlorine or bromine.

The hydrocarbon-based solvent includes an olefin oligomer, polybutene, alkyl benzene, or the like. The ester-based solvent includes a fatty acid ester or the like. The ether-based solvent includes polyalkylene glycol, phenyl ether, or the like.

The fluorine-containing solvent includes perfluoropolyether, perfluorocarbon, or the like. The phosphorus-containing solvent includes phosphoric ester or the like. The silicon-containing solvent includes silicone, silicic ester, tetra-alkyl silicon, or the like.

The discoloring part 32, 46, 76, 78, 80 or 82 contains a discoloring substance (e.g. an indicator) which discolors when it contacts a cutting fluid including any of the above-mentioned materials.

While the invention has been described hereinabove through the embodiments of the invention, the above-described embodiments do not limit the scope of the invention according to the claims. In addition, embodiments as combinations of the features described in the embodiments of the invention can be also included within the technical range of the invention. However, not all of the combinations thereof are necessary for solving means of the invention. Furthermore, it is apparent for those skilled in the art that various changes or modifications can be added to the above-described embodiments.

The invention claimed is:

1. A motor drive device comprising:
an electronic component; and
a casing which houses the electronic component,
wherein at least a part of an outer surface of the casing includes a base material mixed with a color changing substance that discolors when contacting a cutting fluid.

2. The motor drive device according to claim 1, wherein the at least a part of the casing discolors into different colors in response to a concentration of the contacting cutting fluid.

3. The motor drive device according to claim 1, wherein the casing is made of a material which discolors when contacting the cutting fluid.

4. The motor drive device according to claim 1, wherein the casing includes:
a main body; and
a discoloring part provided on an outer surface of the main body, and discolors when contacting the cutting fluid.

5. The motor drive device according to claim 4, wherein the discoloring part is detachably attached to the outer surface of the main body.

6. The motor drive device according to claim 4, wherein the discoloring part is a thin membrane layer laminated on the outer surface of the main body.

7. The motor drive device according to claim 1, wherein the cutting fluid includes chlorine or bromine.

8. The motor drive device according to claim 1, wherein the casing contains an acid-base indicator which discolors when contacting the cutting fluid.

9. The motor drive device according to claim 1, wherein the color changing substance is positioned at a location on the outer surface of the casing based on a location of the electronic component within the casing.

10. A motor drive device comprising:
an electronic component; and
a casing which houses the electronic component, the casing including a main body and a discoloring part provided on an outer surface of the main body that discolors when contacting the cutting fluid,
wherein the main body includes a flow path for the cutting fluid adhering to the outer surface of the main body, and wherein
the discoloring part is arranged on the flow path.

11. The motor drive device according to claim 10, wherein the flow path is formed by a groove recessed from the outer surface of the main body.

* * * * *